United States Patent
Moon et al.

(10) Patent No.: US 12,449,380 B2
(45) Date of Patent: Oct. 21, 2025

(54) DEFECT ANALYSIS DEVICE AND DEFECT ANALYSIS METHOD USING THE SAME

(71) Applicants: Samsung Display Co., Ltd., Yongin-Si (KR); Dongguk University Industry-Academic Cooperation Foundation, Seoul (KR)

(72) Inventors: Yeon Keon Moon, Yongin-si (KR); Jun Hyung Lim, Yongin-si (KR); Kwun-Bum Chung, Seoul (KR); Kwang Sik Jeong, Seoul (KR); Hyun Min Hong, Seoul (KR)

(73) Assignees: Samsung Display Co., Ltd., Yongin-Si (KR); Dongguk University Industry-Academic Cooperation Foundation, Seoul (KR)

(*) Notice: Subject to any disclaimer, the term of this patent is extended or adjusted under 35 U.S.C. 154(b) by 274 days.

(21) Appl. No.: 18/227,976

(22) Filed: Jul. 31, 2023

(65) Prior Publication Data
US 2024/0102942 A1  Mar. 28, 2024

(30) Foreign Application Priority Data
Sep. 19, 2022  (KR) .................. 10-2022-0118117

(51) Int. Cl.
  *G01N 21/956* (2006.01)
  *G01N 21/88* (2006.01)
  *H01L 21/66* (2006.01)

(52) U.S. Cl.
  CPC ....... *G01N 21/956* (2013.01); *G01N 21/8806* (2013.01); *H01L 22/12* (2013.01)

(58) Field of Classification Search
  CPC .. G01N 21/956; G01N 21/8806; G01N 21/88; H01L 22/12; G01R 31/311; G01R 31/2656; G01R 13/38; G01R 15/22; G01R 31/2621; H01S 3/0014
  See application file for complete search history.

(56) References Cited

U.S. PATENT DOCUMENTS

| 7,045,786 B2 | 5/2006 | Mandelis et al. |
| 9,523,648 B2 | 12/2016 | Urano et al. |
| 9,748,151 B2 | 8/2017 | Ohtsuki et al. |

(Continued)

FOREIGN PATENT DOCUMENTS

| JP | 5993691 B2 | 9/2016 |
| JP | 6083404 B2 | 2/2017 |

(Continued)

*Primary Examiner* — Seung C Sohn
(74) *Attorney, Agent, or Firm* — Innovation Counsel LLP

(57) ABSTRACT

Provided is a defect analysis device which may include a light source that irradiates an analysis target layer of an element with light, a position adjuster that adjusts a position in the analysis target in the analysis target to be irradiated with the light, a detector that measures a current value of current flowing between a source area of the element electrically connected to one end of the analysis target layer and a drain area of the element electrically connected to the other end of the analysis target layer in the element, and an analyzer that acquires quantitative data related to a defect in the analysis target layer on the basis of the current value in which, in a first mode, a plurality of areas of the analysis target layer are sequentially irradiated with the light.

20 Claims, 16 Drawing Sheets

(56) References Cited

U.S. PATENT DOCUMENTS

2007/0041631 A1* 2/2007 Fushida ................. H01L 22/12
257/E21.53
2008/0106730 A1* 5/2008 Schulat .............. G01N 21/8483
356/73

FOREIGN PATENT DOCUMENTS

| KR | 10-1642429 B1 | 7/2016 |
| KR | 10-2022-0008441 A | 1/2022 |

* cited by examiner

DEFECT ANALYSIS DEVICE AND DEFECT ANALYSIS METHOD USING THE SAME

CROSS-REFERENCE TO RELATED APPLICATIONS

This U.S. non-provisional patent application claims priority under 35 U.S.C. § 119 to Korean Patent Application No. 10-2022-0118117, filed on Sep. 19, 2022, the entire contents of which are hereby incorporated by reference.

BACKGROUND

The present disclosure herein relates to a defect analysis device for quantitatively analyzing a defect in an element and a defect analysis method using the defect analysis device.

A field effect transistor controls a current flowing through a source area and a drain area by applying a voltage to a gate, and is being used as a switching and driving element, etc., in display fields. In a field effect transistor, an element structure may be formed by selectively growing or depositing a semiconductor on a substrate, then forming a gate dielectric and a metal gate by deposition, and performing a photolithography process and an etching process. At a junction portion and an interface which are formed during the procedure described above, defects may inevitably occur due to differences in crystals, foreign substances, physical characteristics, and the like. A transistor which has a much thinner film and also a more complicated structure, may have more fine and complicated defects due to high density integration.

SUMMARY

The present disclosure provides a defect analysis device for quantitatively analyzing a defect in an element.

The present disclosure also provides a defect analysis method of quantitatively analyzing a defect in an element.

An embodiment of the inventive concept provides a defect analysis device for including a light source configured to irradiate an analysis target layer of an element with light, a position adjuster configured to adjust a position to be irradiated with the light, a detector configured to measure a current value of current flowing between a source area of the element electrically connected to one end of the analysis target layer and a drain area of the element electrically connected to the other end of the analysis target layer in the element, and an analyzer configured to acquire quantitative data related to a defect in the analysis target layer on a basis of the current, wherein in a first mode, a plurality of areas of the analysis target layer are sequentially irradiated with the light.

In an embodiment, in a second mode different from the first mode, a predetermined area of the analysis target layer may be irradiated with the light.

In an embodiment, the light supplied by the light source may have a resolution of less than about 2 micrometers.

In an embodiment, in the first mode, the detector may measure a plurality of first photocurrents generated by sequentially irradiating the plurality of areas with the light, and, in the second mode, the detector may measure a second photocurrent generated by irradiating the predetermined area with the light.

In an embodiment, in the first mode, the analyzer may acquire a plurality of first quantitative data about the plurality of first photocurrents and perform mapping on the plurality of first quantitative data corresponding to the plurality of areas, respectively, and, in the second mode, the analyzer may acquire second quantitative data about the second photocurrent.

In an embodiment, the defects may include a physical defect caused by a foreign substance and a defect caused by a chemical bond of constituent atoms.

In an embodiment, the quantitative data may be related to defect state activation energy and a defect density of the analysis target layer.

In an embodiment, the defect analysis device may further include a temperature controller configured to control a temperature of the analysis target layer.

In an embodiment, the defect analysis device may further include a compensator configured to repair a defect in the analysis target layer on the basis of the quantitative data, wherein the compensator may repair a defect in the analysis target layer using heat energy by irradiating the analysis target layer with laser or changes a process parameter.

In an embodiment, in the first mode, the position adjuster may adjust an irradiation position of the light emitted from the light source.

In an embodiment, the analysis target layer may be a semiconductor layer including a channel area of the element.

In an embodiment of the inventive concept, a defect analysis method includes adjusting a position at which an analysis target layer of an element disposed on a substrate is irradiated with light, irradiating the analysis target layer with the light, measuring a current flowing between a source area of the element electrically connected to one end of the analysis target layer and a drain area of the element electrically connected to the other end of the analysis target layer, and analyzing a defect characteristic of the analysis target layer as quantitative data on a basis of the current, wherein the irradiating of the analysis target layer with light includes irradiating the analysis target layer with light in a first mode in which a plurality of areas in the analysis target layer are sequentially irradiated with the light.

In an embodiment, the irradiating of the analysis target layer with the light may further include irradiating the analysis target layer with light in a second mode different from the first mode, the second mode being a mode in which a predetermined area of the analysis target layer is irradiated with light.

In an embodiment, the light may be supplied from a lower surface of the substrate toward the analysis target layer of the element disposed on an upper surface of the substrate.

In an embodiment, the light may be supplied to the analysis target layer of the element disposed on an upper surface of the substrate, and a propagation direction of the light may be directed from the upper surface to a lower surface of the substrate.

In an embodiment, the method may further include performing a subsequent process on the basis of the quantitative data.

In an embodiment, the performing of the subsequent process on the basis of the quantitative data may include storing correlation between an element characteristic and the defect characteristic.

In an embodiment, the performing of the subsequent process on the basis of the quantitative data may further include repairing a defect in the analysis target layer by irradiating laser in an area in which the defect is present.

In an embodiment, the laser may have a wavelength corresponding to the defect to be repaired.

In an embodiment, the performing of the subsequent process on the basis of the quantitative data may include changing a process parameter according to the defect characteristic, the process parameter including at least one condition such as a composition of the element, oxygen partial pressure, plasma power, process pressure, atmosphere gas, and heat treatment temperature during a manufacturing process of the element.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
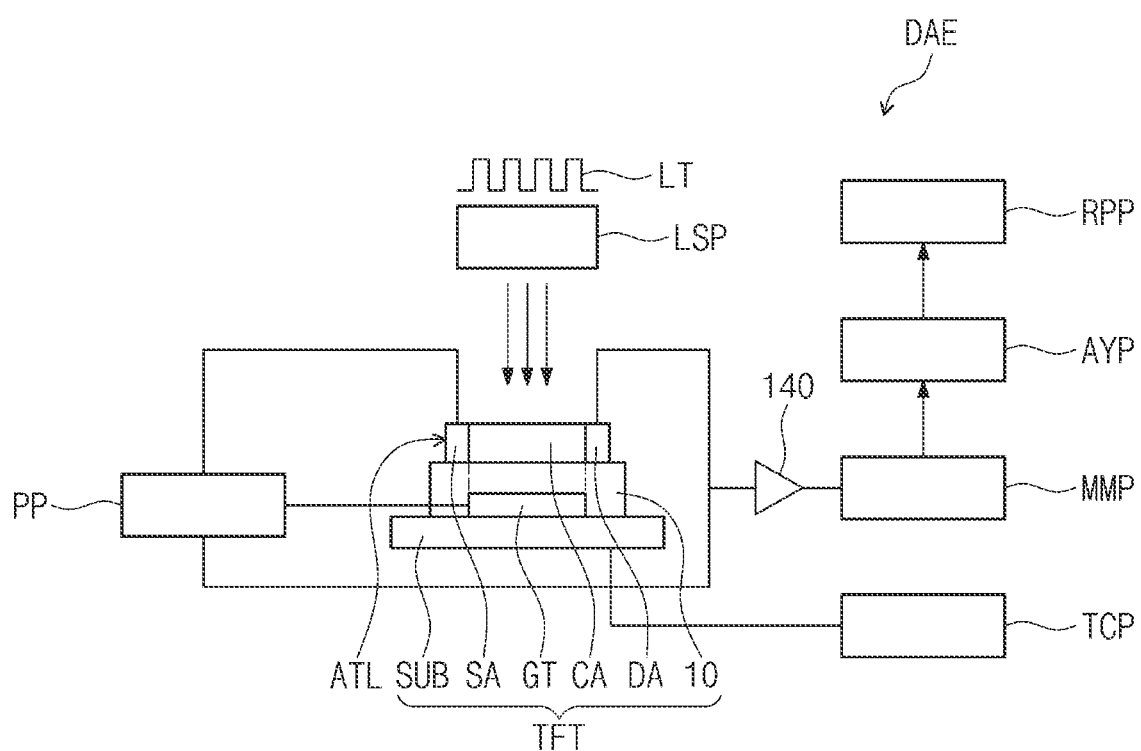
FIG. 1 is a schematic view illustrating a defect analysis device according to an embodiment of the inventive concept.

In this specification, it will be understood that when an element (region, layer, or portion) is referred to as being "on", "connected to" or "coupled to" another element, it can be directly on, connected or coupled to the other element or intervening elements may be present.

Like reference numerals or symbols refer to like elements throughout. In the drawings, the thickness and the ratio and the dimension of the element are exaggerated for effective description of the technical contents. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. For instance, a first element could be termed a second element and a second element could be termed a first element without departing from the teachings of the inventive concept. The singular forms are intended to include the plural forms as well unless the context clearly indicates otherwise.

The terms such as "below", "lower", "above", "upper" and the like, may be used herein for the description to describe one element's relationship to another element illustrated in the figures. It will be understood that the terms have a relative concept and are described on the basis of the orientation depicted in the figures.

It will be understood that the terms "include" or "have" and the like, when used in this specification, specify the presence of stated features, integers, steps, operations, elements, and/or components or combinations thereof, but do not preclude the presence or addition of one or more other features, integers, steps, operations, elements, components, or combinations thereof.

The terms "part" and "unit" mean a software component or a hardware component that performs a specific function. The hardware component may include, for example, a field-programmable gate array (FPGA) or an application-specific integrated circuit (ASIC). A software component may refer to executable code and/or data used by the executable code in an addressable storage medium. Thus, software components may be, for example, object-oriented software components, class components and task components, including processes, functions, characteristics, procedures, subroutines, program code segments, drivers, firmware, microcodes, circuits, data, databases, data structures, tables, arrangements or parameter.

Unless otherwise defined, all terms (including technical and scientific terms) used herein have the same meaning as commonly understood by one of ordinary skill in the art to which the inventive concept belongs. Further, it will be understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the inventive concept will be explained with reference to the accompanying drawings.

FIG. 1 is a schematic view illustrating a defect analysis device DAE according to an embodiment of the inventive concept.

Referring to FIG. 1, the defect analysis device DAE may analyze a defect in an element, for example, a thin-film transistor TFT. For example, to analyze a defect, the defect analysis device DAE may be electrically connected to the element TFT. The element TFT may be an element TFT during a manufacturing process of a display device. The element TFT may include a substrate SUB, a gate GT disposed on the substrate SUB, and an analysis target layer ATL. The gate GT and the analysis target layer ATL may be insulated through an insulating layer 10. FIG. 1 schematically illustrates the element TFT.

The analysis target layer ATL may be a semiconductor layer including a channel area CA, a source area SA, and a drain area DA of the element TFT. For example, the analysis target layer ATL may include an oxide of one or more selected from the group including indium (In), gallium (Ga), stanium (Sn), zirconium (Zr), vanadium (V), hafnium (Hf), cadmium (Cd), germanium (Ge), chromium (Cr), titanium (Ti), aluminum (Al), cesium (Cs), cerium (Ce), and zinc (Zn). For example, the analysis target layer ATL may be an ITZO (InSnZnO) semiconductor layer, an IGZO (InGaZnO) semiconductor layer, and the like. As another example, the analysis target layer ATL may be a silicon semiconductor. For example, the silicon semiconductor may include amorphous silicon, polycrystalline silicon, and the like. For example, the semiconductor pattern may include low-temperature polysilicon.

FIG. 1 illustrates that the element TFT for which the defect analysis device DAE analyzes a defect is a semiconductor device as an example, but an analysis target is not limited thereto. For example, an analysis target of the defect analysis device DAE may be a thin film having optical and/or electrical characteristics such as a conductor, a semiconductor, and an insulator.

A defect in the element TFT may include a physical defect caused by a foreign substance and a defect caused by chemical bonds of constituent atoms. The defect analysis device DAE may quantitatively analyze the characteristics and amount of defects by measuring a current I (see FIG. 5D) flowing through each thin film or each element TFT. The defect analysis device DAE may provide information for performing follow up measures by analyzing a correlation between operation characteristics of the element TFT and the defects, or perform follow-up measures. The follow-up measures may be a measure to reduce a defect occurrence in the element TFT by adjusting a process parameter, or to fix defects in the element TFT by irradiating a defective portion with light. Descriptions thereof will be illustrated later in detail.

The defect analysis device DAE may include a light source LSP, a power source PP, a temperature controller TCP, an amplifier 140, a detector MMP, and an analyzer AYP. The defect analysis device DAE may further include a position adjuster PCP which is disclosed in FIG. 10A or PCPa which is disclosed in FIG. 10B.

The light source LSP may emit light toward the analysis target layer ATL. Specifically, the light source LSP may emit, toward the analysis target layer ATL, light having energy greater than or equal to a band gap $E_g$ of the analysis target layer ATL. For example, the light emitted from the light source LSP may transfer electrons in a valence band VB to a defect state present between a conduction band CB and the band gap $E_g$, or move the defect state toward the conduction band CB. Also, the light emitted from light source LSP may transfer electrons in the valence band VB to the conduction band CB. Emission methods and directions of light by the light source LSP may vary according to types, shapes, structures, and materials of an element. The light source LSP may irradiate the analysis target layer ATL with pulsed light LT. Since the pulsed light LT includes an on-section and an off-section, the light, with which the analysis target layer ATL is irradiated, may be controlled to be on/off. That is, the light source LSP may intermittently irradiate the analysis target layer ATL with light.

The power source PP may be connected to each of the gate GT, the source area SA, and the drain area DA of the element TFT, and may supply a voltage to at least a portion of the gate GT, the source area SA, and/or the drain area DA of the element TFT. The voltage applied to the source area SA and the drain area DA may allow electrons in a defect state of the analysis target layer ATL to be transferred to the conduction band CB.

The temperature controller TCP may control the temperature of the analysis target layer ATL. The temperature controller TCP may include a low-temperature medium such as liquid helium and liquid nitrogen, and an electric heater and the like. The temperature of the analysis target layer ATL may be lowered through a low-temperature medium, and the temperature of the analysis target layer ATL may be raised through an electric heater. The range of the temperature varying through the temperature controller TCP may be a range in which the element TFT is not damaged. The range in which the element TFT is not damaged may vary according to the characteristics of the element TFT, and may be predicted on the basis of the characteristics of the element TFT.

The detector MMP may measure the current I (see FIG. 5D) flowing between the source area SA of the element TFT electrically connected to one end of the analysis target layer ATL and the drain area DA of the element TFT electrically connected to the other end of the analysis target layer ATL. Specifically, the detector MMP may measure the current I flowing between the source area SA and the drain area DA when the analysis target layer ATL is not irradiated with light, and also measure the current I flowing between the source area SA and the drain area DA when the analysis target layer is irradiated with light. The current I flowing between the source area SA and the drain area DA may be amplified through the amplifier 140 and then the detector MMP may receive the amplified current. For example, the detector MMP may be a digital oscilloscope.

The analyzer AYP may acquire quantitative data QD-A1, QD-A2, and QD-A3 (see FIGS. 6A to 6C) of defects existing in the analysis target layer ATL based on the current I flowing between the source area SA and the drain area DA, measured by the detector MMP. The quantitative data QD-A1, QD-A2, and QD-A3 may be related to defect state activation energy $E_a$ and a defect state density $N_0$ of the analysis target layer ATL. The analyzer AYP may be configured to extract a decay constant through Laplace transform on the current I.

The defect analysis device DAE may further include a compensator RPP. The compensator RPP may repair, on the basis of the quantitative data QD-A1, QD-A2, and QD-A3, a defect in the analysis target layer ATL using heat energy by irradiating the analysis target layer ATL with laser or may prevent a defect occurrence by adjusting process parameters.

Figure 2A:
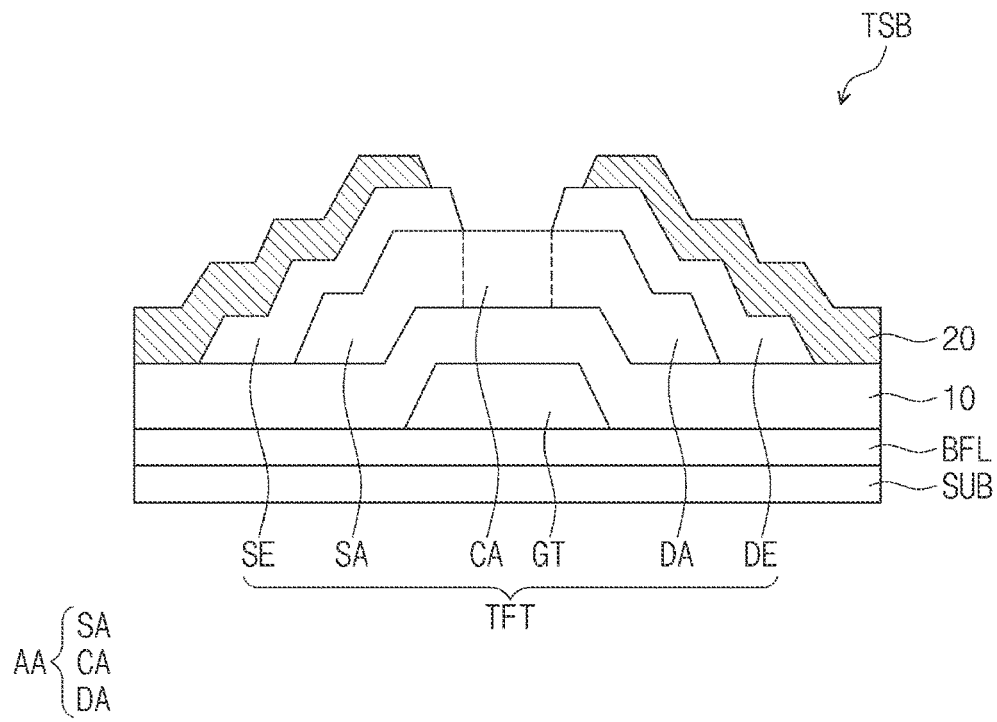
FIGS. 2A and 2B are cross-sectional views illustrating a test target substrate including an element according to an embodiment of the inventive concept.

FIG. 2A is a cross-sectional view illustrating a test target substrate TSB including an element TFT according to an embodiment of the inventive concept.

Referring to FIG. 2A, the test target substrate TSB may include a substrate SUB, a buffer layer BFL, an element TFT, a first insulating layer 10, and a second insulating layer 20. The element TFT may include a gate GT, a semiconductor pattern AA, a source electrode SE, and a drain electrode DE.

The substrate SUB may provide a base surface on which the element TFT is disposed. The substrate SUB may be a glass substrate, a metal substrate, or a polymer substrate. However, an embodiment of the inventive concept is not limited thereto, and the substrate SUB may have a multi-layer structure including an inorganic layer, an organic layer, or a composite material layer.

The buffer layer BFL may be disposed on the substrate SUB. The buffer layer BFL may prevent metal atoms or impurities from being diffused from the substrate SUB to a semiconductor pattern disposed thereabove.

The gate GT may be disposed on the buffer layer BFL. The gate GT may be a portion of a metal pattern. The gate GT may include titanium (Ti), silver (Ag), Ag-containing alloy, molybdenum (Mo), Mo-containing alloy, aluminum (Al), Al-containing alloy, aluminum nitride (AlN), tungsten (W), tungsten nitride (WN), copper (Cu), indium tin oxide (ITO), indium zinc oxide (IZO), and/or the like, but is not particularly limited thereto.

The first insulating layer 10 may be disposed on the buffer layer and the gate GE and may cover the gate GE. The first insulating layer 10 may include an inorganic layer and/or an organic layer, and may have a single-layer or multi-layer structure. The inorganic layer may include at least one of aluminum oxide, titanium oxide, silicon oxide, silicon nitride, silicon oxynitride, zirconium oxide, or hafnium oxide.

The semiconductor pattern AA may be disposed on the first insulating layer 10, and the source electrode SE and the drain electrode DE may be disposed on the semiconductor pattern AA and the first insulating layer 10. The semiconductor pattern AA may include the source area SA, the drain area DA, and the channel area CA. The source area SA, the drain area DA, and the channel area CA may be formed from a semiconductor pattern. In a cross-section, the source area SA and the drain area DA may extend in opposite directions from the channel area CA. The source area SA may be a portion of the semiconductor pattern AA overlapping the source electrode SE and the drain area DA may be a portion of the semiconductor pattern AA overlapping the drain electrode DE. The channel area CA may be an area which is disposed between the source area SA and the drain area DA and in which electrons may be transferred. The analysis target layer ATL (see FIG. 1) may be the semiconductor pattern AA.

The second insulating layer 20 may be disposed on the source electrode SE and the drain electrode DE.

Figure 2B:
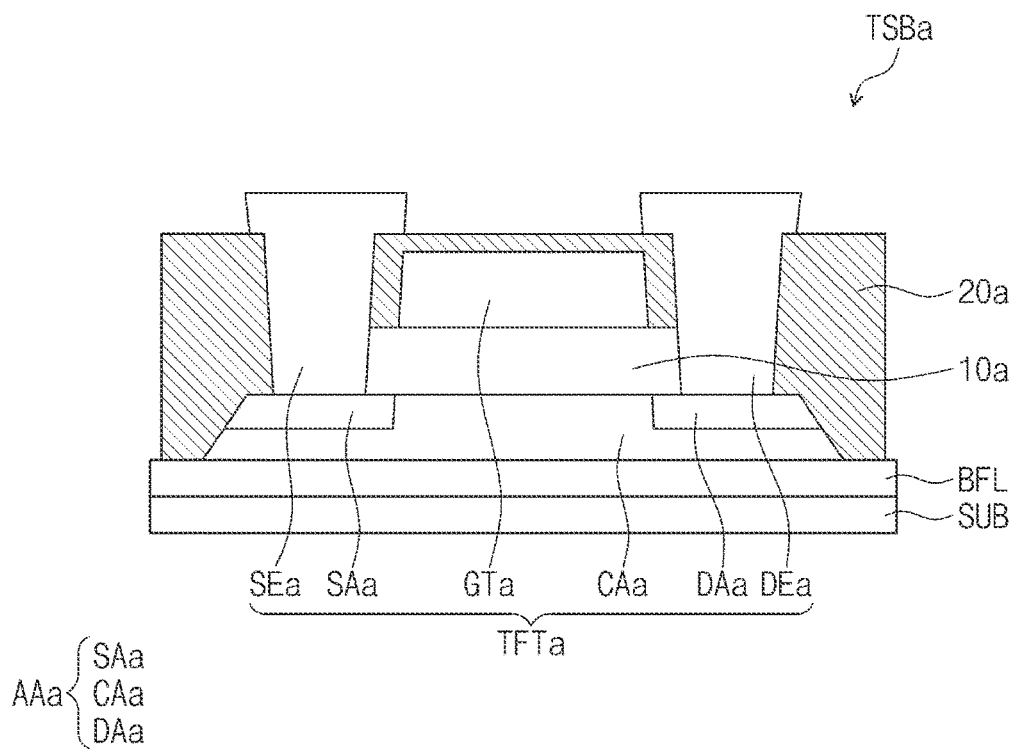

FIG. 2B is a cross-sectional view illustrating a test target substrate TSBa including an element TFTa according to an embodiment of the inventive concept.

Referring to FIG. 2B, the test target substrate TSBa may include a substrate SUB, a buffer layer BFL, an element TFTa, a first insulating pattern 10a, and a second insulating layer 20a. The element TFTa may include a semiconductor pattern AAa, a gate GTa, a source electrode SEa, and a drain electrode DEa.

The semiconductor pattern AAa may be disposed on the buffer layer BFL. The semiconductor pattern AAa may include a source area SAa, a drain area DAa, and a channel area CAa. The source area SAa, the drain area DAa, and the channel area CAa may be formed from the semiconductor pattern AAa. In a cross-section, the source area SAa and the drain area DAa may extend in opposite directions from the channel area CAa.

The semiconductor pattern AAa may include a first area having high conductivity and a second area having low conductivity. The first area may be doped with an N-type dopant or a P-type dopant. A P-type transistor may include a doped area doped with a P-type dopant and a N-type transistor may include a doped area doped with a N-type dopant. The second area may be an undoped area or may be a doped area having a lower concentration than that of the first area.

The first area may have higher conductivity than that of the second area. The first area may substantially serve as an electrode or a signal line. The second area may substantially correspond to the channel area CAa of the transistor. In other words, a portion of the semiconductor pattern AAa may be the channel area CAa of the transistor, another portion may be the source area SAa or the drain area DAa, and still another portion may be a connection electrode or a connection signal line.

The first insulating pattern 10a may be disposed on the semiconductor pattern AAa, and the gate GTa may be disposed on the first insulating pattern 10a. The first insulating pattern 10a may be disposed to overlap the channel area CAa of the semiconductor pattern AAa and cover a portion of the semiconductor pattern AAa.

The gate GTa may be disposed to overlap the first insulating pattern 10a. However, in an embodiment of the inventive concept, the first insulating pattern 10a may be an insulating layer which covers the source area SAa, the drain area DAa, and the channel area CAa except a source contact hole and a drain contact hole.

The second insulating layer 20a may be disposed on the buffer layer BFL and cover the gate GTa and the semiconductor pattern AAa. The source electrode SEa and the drain electrode DEa may be disposed on the second insulating layer 20a. The source electrode SEa may contact the source area SAa through the source contact hole formed in the second insulating layer 20a and the drain electrode DEa may contact the drain area DAa through the drain contact hole formed in the second insulating layer 20a. The source electrode SEa and the drain electrode DEa may be referred to as a first connection electrode and a second connection electrode, respectively. The analysis target layer ATL (see FIG. 1) may be the semiconductor pattern AAa.

Figure 3:
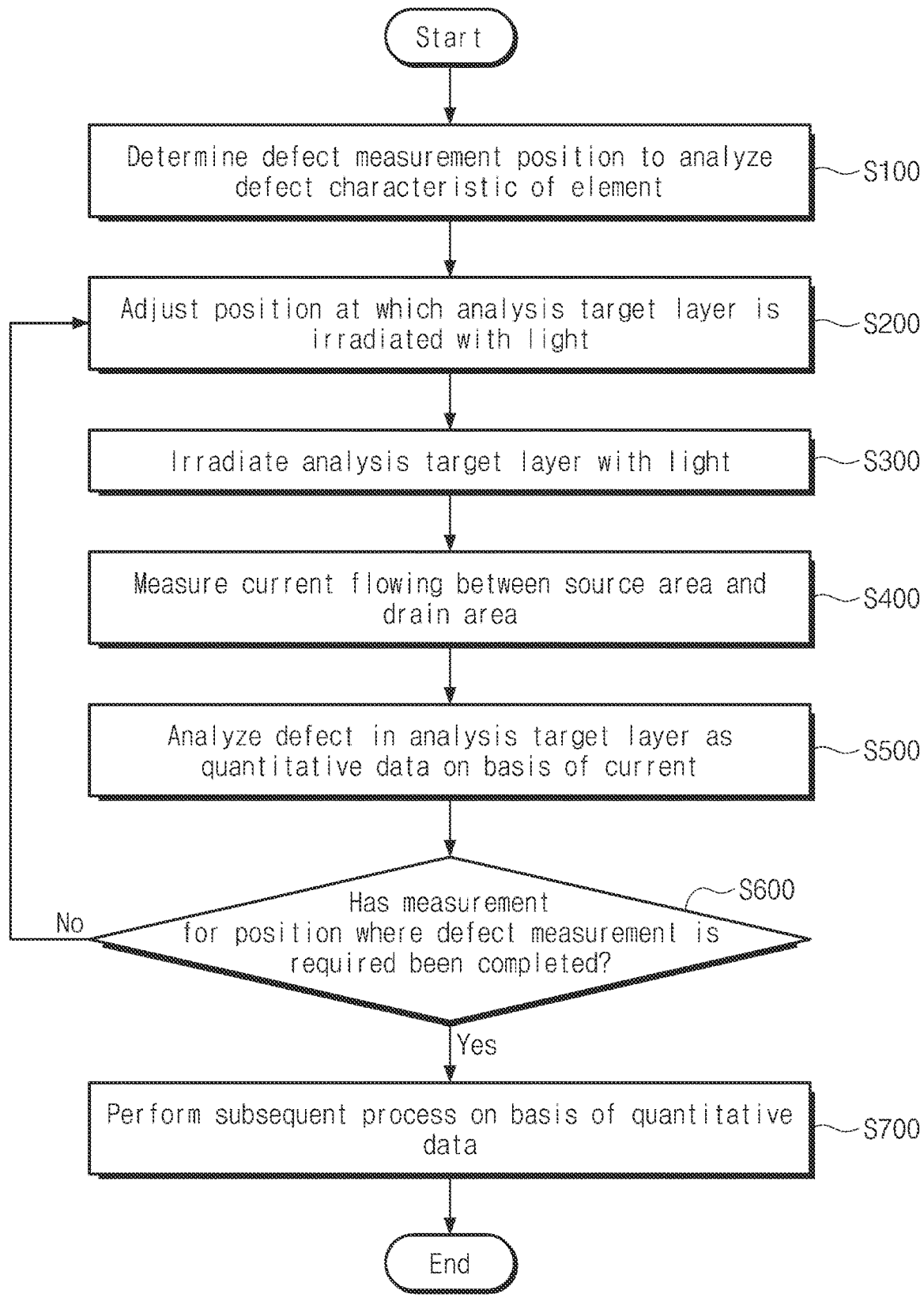
FIG. 3 is a flowchart of a defect analysis method according to an embodiment of the inventive concept.

FIG. 3 is a flowchart of a defect analysis method according to an embodiment of the inventive concept.

Referring to FIGS. 1 and 3, the defect analysis device DAE may determine a defect measurement position for analysis of defect characteristics of the element TFT (S100). In detail, the defect analysis device DAE may measure the characteristic of the manufactured element TFT to analyze a difference from the characteristic of a reference element. For example, the characteristic, to be measured, of the element TFT may include a threshold voltage (referred to as Vth), a subthreshold swing (SS) characteristic, instability, a leakage current, a kink effect, and like. A comparative analysis result with a reference element makes it possible to identify problems which may occur in the element TFT. On the basis of the identified problems, a position at which a defect is likely to occur may be predicted and a defect measurement position may be determined.

The defect analysis device DAE may adjust a position at which the analysis target layer ATL is irradiated with the light LT (S200). The defect analysis device DAE may operate in a first mode M1 (see FIG. 8) or a second mode M2 (see FIG. 11). For example, when the characteristic of a reference element, which has been measured previously, is the same as the characteristic of an element to be analyzed, the defect analysis device DAE may operate in the second mode. For example, in the second mode, the defect analysis device DAE may adjust a position such that a position, which is the same as the defect measurement position of the reference element, is irradiated with light. When the characteristic of a reference element, which has been measured previously, is different from the characteristic of the element TFT to be analyzed, the defect analysis device DAE may operate in the first mode. The defect analysis device DAE may adjust a light irradiation position such that the analysis target layer ATL of the element TFT is measured in a scanning manner. The first mode M1 and the second mode M2 will be described later in more detail.

Figure 4A:
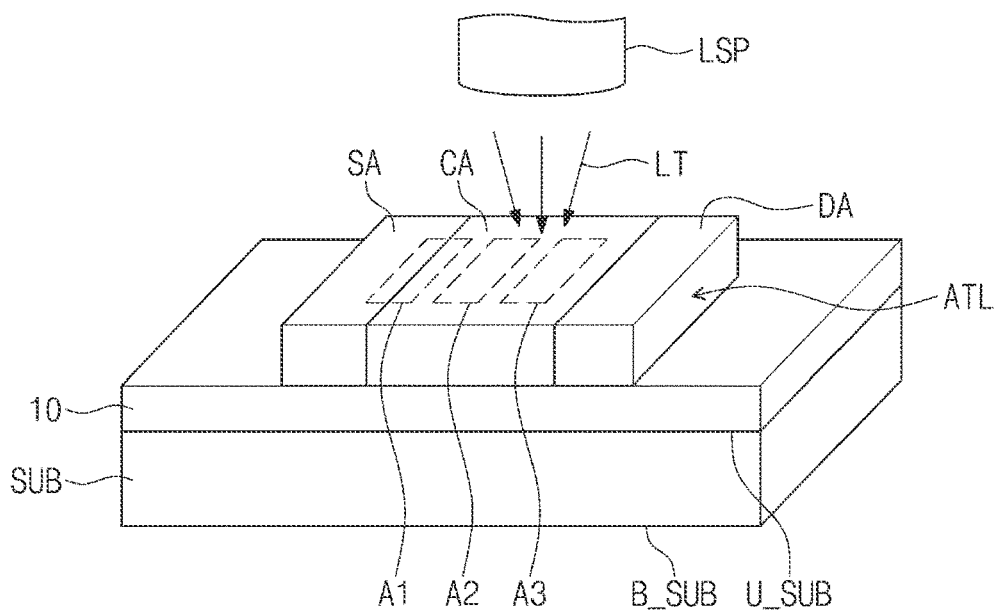
FIGS. 4A and 4B are perspective views illustrating a part of a defect analysis method according to an embodiment of the inventive concept.

FIG. 4A is a perspective view illustrating a part of a defect analysis method according to an embodiment of the inventive concept.

Referring to FIGS. 3 and 4A, the light source LSP may irradiate the analysis target layer ATL with light (S300). The light LT may be supplied to the analysis target layer ATL of the element TFT (see FIG. 1) disposed on an upper surface U_SUB of the substrate SUB. A propagation direction of the light LT may be directed from the upper surface U_SUB of the substrate SUB toward a lower surface B_SUB of the substrate SUB. In this case, the substrate SUB and the first insulating layer 10 may each include a transparent material or an opaque material. The light LT emitted from the light source LSP may have energy greater than or equal to the energy gap $E_g$ and be emitted to the analysis target layer ATL to change a photocurrent.

The light source LSP may supply light to a plurality of areas A1, A2, and A3. The plurality of areas A1, A2, and A3 may include the first area A1, the second area A2, and the third area A3. The first area A1 may be an area overlapping a portion of the source area SA and a portion of the channel area CA, and the second area A2 and the third area A3 may each be an area overlapping a portion of the channel area CA. The light source LSP may sequentially irradiate the first to third areas A1, A2, and A3 with light, and may irradiate only one area of A1, A2, or A3 with light. The light source LSP may emit the light LT toward a position at which a defect is to be measured, among the plurality of areas A1, A2, and A3. Emission of the light LT to the position at which a defect is to be measured may cause the photocurrent to be changed.

The length from the source area SA to the drain area DA of the element TFT (see FIG. 1) may have about 5 micrometers to about 7 micrometers. The light LT emitted from the light source LSP may have a resolution of greater than 1 micrometer and less than 2 micrometers. The resolution of the light LT may correspond to a size of the light LT. Accordingly, the light source LSP may irradiate the analysis target layer ATL with the light LT at least three times. Therefore, the plurality of areas A1, A2, and A3 may include three areas.

FIG. 4A illustrates that the shapes of the plurality of areas A1, A2, and A3 are rectangles and the numbers of the plurality of areas A1, A2, and A3 are three as an example, but an embodiment of the inventive concept is not limited thereto. The shapes of the plurality of areas A1, A2, and A3 may vary according to the shape of the light LT, and the number of the plurality of areas A1, A2, and A3 may vary according to the resolution of light and the width of the analysis target layer. For example, the plurality of areas A1, A2, and A3 may have a circular shape and may include two or less or four or more areas.

Figure 4B:
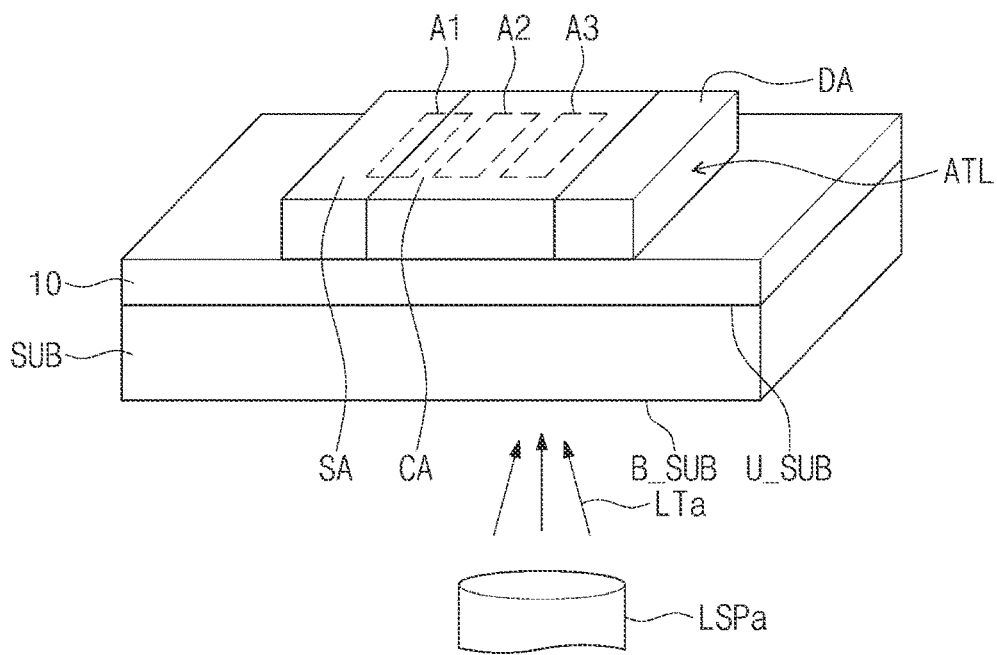

FIG. 4B is a perspective view illustrating a part of a defect analysis method according to an embodiment of the inventive concept. In the description of FIG. 4B, the description will be focused on the differences from FIG. 4A, the same reference numerals or symbols are used for the duplicated components and a description thereof will be omitted.

Referring to FIGS. 3 and 4B, a light source LSPa may supply light LTa from the lower surface B_SUB of the substrate SUB toward the analysis target layer ATL disposed on the upper surface U_SUB of the substrate SUB. In this case, the substrate SUB and the first insulating layer 10 may each include a transparent material.

Figure 5A:
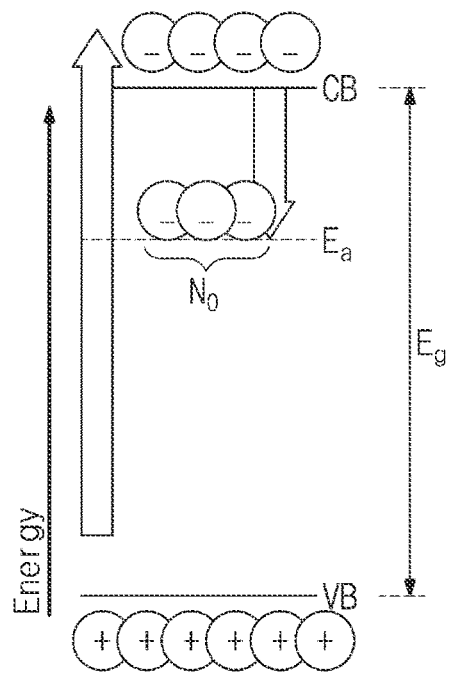
FIGS. 5A, 5B and 5C are views illustrating transfer of electrons distributed in an analysis target layer according to a defect analysis method according to an embodiment of the inventive concept.
Figure 5B:
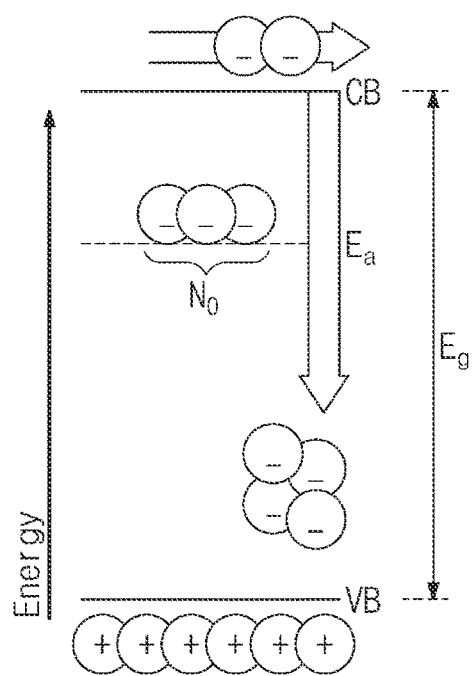
Figure 5C:
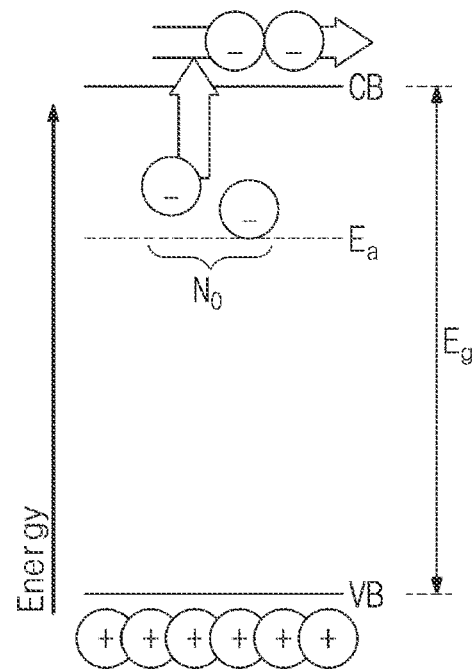
Figure 5D:
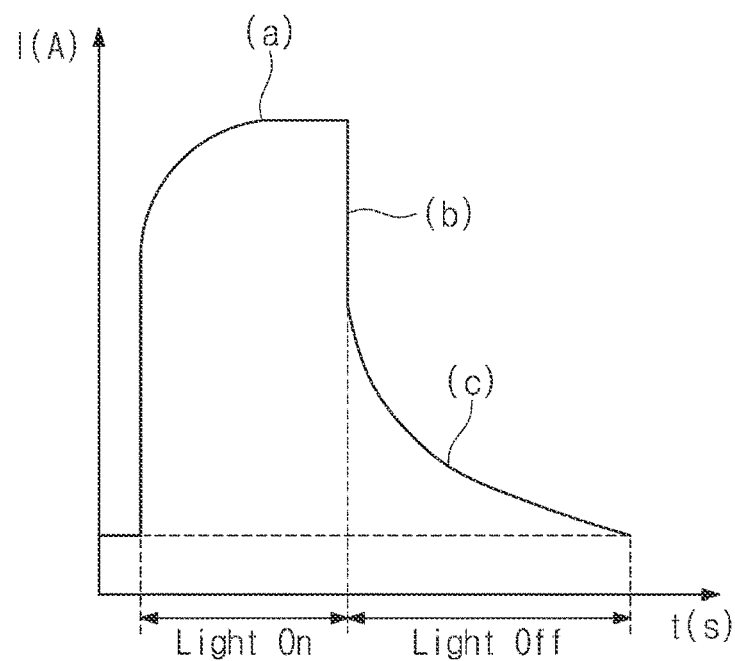
FIG. 5D is a graph showing a change in a current value according to an embodiment of the inventive concept.

FIGS. 5A to 5C are views illustrating transfer of electrons distributed in the analysis target layer ATL (see FIG. 1) according to a defect analysis method according to an embodiment of the inventive concept. FIG. 5A corresponds to a case in which the analysis target layer ATL is irradiated with light, and FIGS. 5B and 5C correspond to cases in which the analysis target layer ATL is not irradiated with light. FIG. 5D is a graph showing a change in the current I according to an embodiment of the inventive concept.

Referring to FIGS. 1, 3 and 5A to 5C, the defect analysis device DAE may measure the current I (see FIG. 5D) flowing between the source area SA electrically connected to one end of the analysis target layer ATL and the drain area DA electrically connected to the other end of the analysis target layer ATL (S400).

Referring to FIGS. 1 and 5A, when the analysis target layer ATL is irradiated with the light LT having energy greater than or equal to the band gap $E_g$ of the analysis target layer ATL, electrons in the valence band VB may absorb energy from light and are excited from the valence band VB to the conduction band CB. A defect state may be present in energy levels disposed between the conduction band CB and the valence band VB. The defect state has specific activation energy $E_a$ and when the analysis target layer ATL is irradiated with a sufficient amount of light, electrons also occupy even a defect state. Accordingly, as shown in (a) of FIG. 5D, the current I (see FIG. 5D) flowing between the source area SA and the drain area DA may increase instantaneously and then reach a saturated state. In the saturated state, the current I flowing between the source area SA and the drain area DA may not increase but may maintain a constant value.

FIG. 5A illustrates, as an example, that one defect state activation energy $E_a$ is present between the conduction band CB and the valence bans VB, but an embodiment of inventive concept is not limited thereto. For example, the defect state activation energy $E_a$ may be present in plurality energy levels between the conduction band CB and the valence band VB. That is, a plurality of defect states may be present between the conduction band CB and the valence band VB, and the plurality of the defect states may each have activation energy $E_a$.

Referring to FIGS. 1 and 5B, after the electrons occupy the conduction band CB and a defect state during irradiation of the light LT to the analysis target layer ATL, the irradiation of the light LT is stopped, the electrons present in the conduction band CB are dropped to the valence band VB. Accordingly, as shown in (b) of FIG. 5D, the current I of current flowing between the source area SA and the drain area DA may decrease rapidly.

Referring to FIGS. 1 and 5C, the electrons in the conduction band CB are dropped to the valence band VB, and then the electrons present in a defect state jump to the conduction band CB due to a voltage applied between the source area SA and the drain area DA. Therefore, as shown in (c) of FIG. 5D, the electrons present in the defect state escape through the conduction band CB, so that the current I gradually decreases as time passes.

The result measured by the detector MMP of the defect analyzer DAE, according to an embodiment of the inventive concept, corresponds to (c) of FIG. 5D. That is, since (c) of FIG. 5D shows a current I due to electrons escaped from a defect state, the defect state activation energy $E_a$ and the defect state defect density $N_0$ may each be extracted by analyzing the area of (c).

Figure 6A:
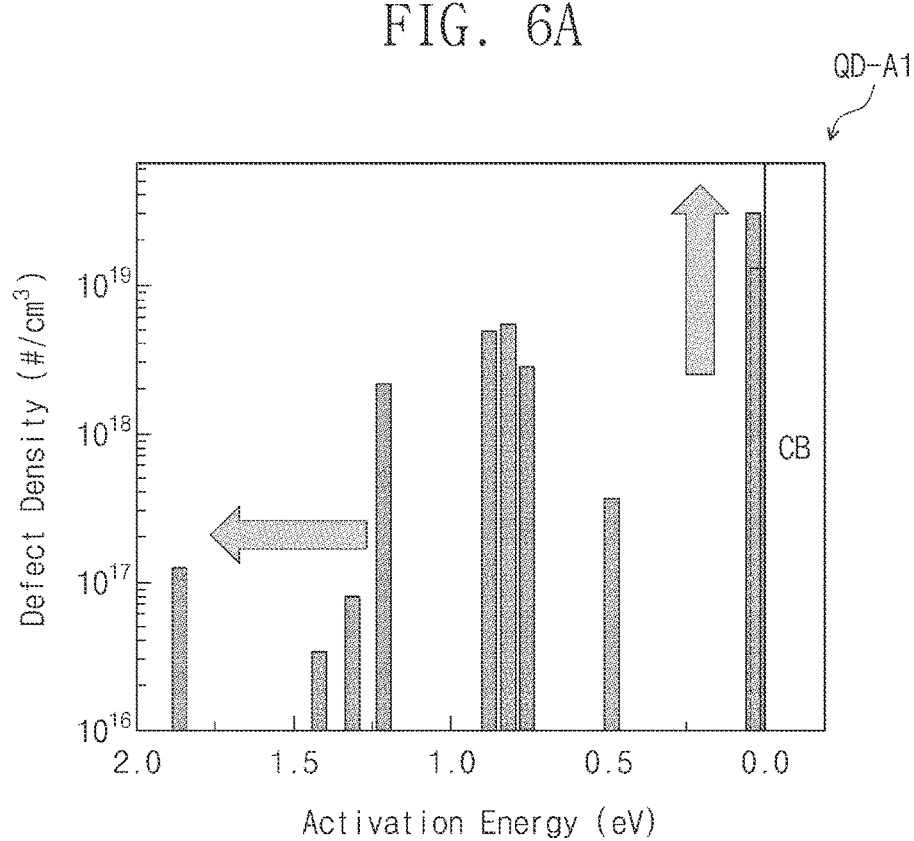
FIG. 6A is a graph showing quantitative data corresponding to a first area of FIG. 4A.
Figure 6B:
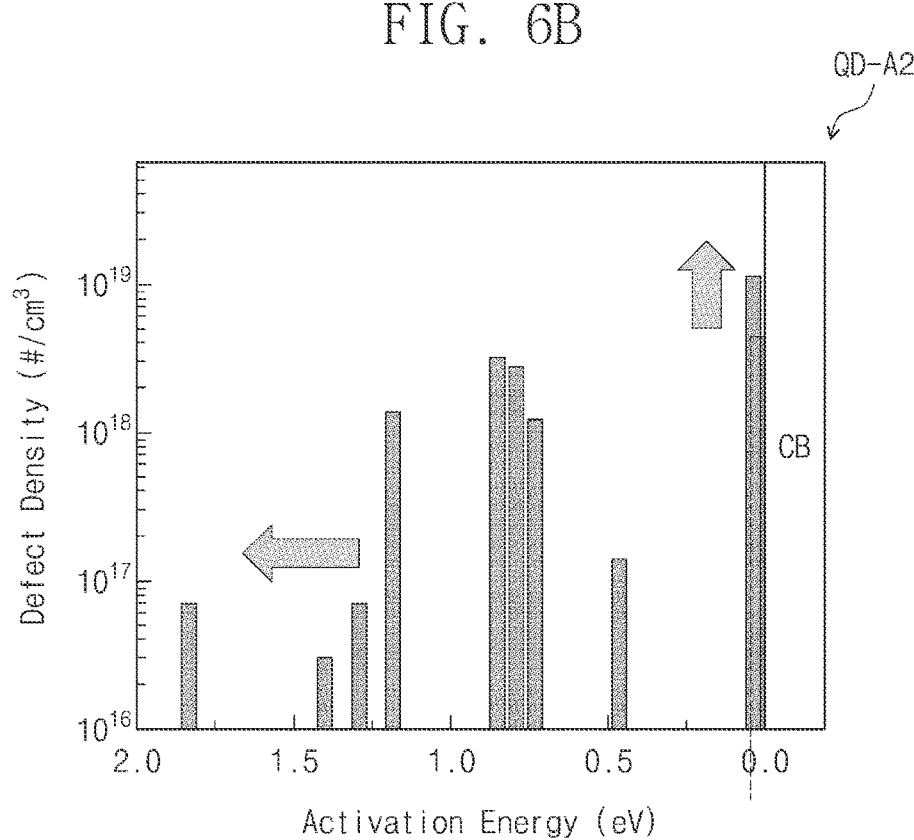
FIG. 6B is a graph showing quantitative data corresponding to a second area of FIG. 4A.
Figure 6C:
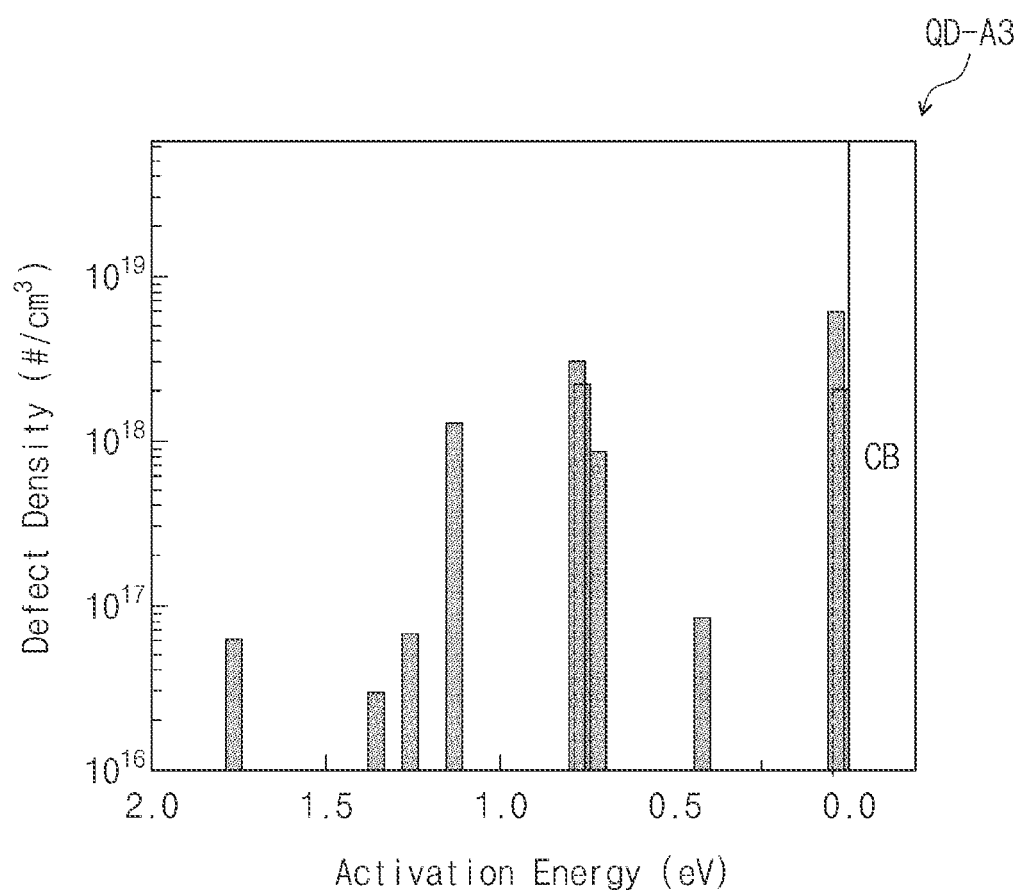
FIG. 6C is a graph showing quantitative data corresponding to a third area of FIG. 4A.

FIG. 6A is a graph showing quantitative data QD-A1 corresponding to a first area A1 of FIG. 4A, FIG. 6B is a graph showing quantitative data QD-A2 corresponding to a second area A2 of FIG. 4A, FIG. 6C is a graph showing quantitative data QD-A3 corresponding to a third area A3 of FIG. 4A.

Referring to FIGS. 1, 3, and 6A to 6C, the analyzer AYP of the defect analysis device DAE may analyze defect characteristics of the analysis target layer ATL as the quantitative data QD-A1, QD-A2, and QD-A3 on the basis of the current I (see FIG. 5D) (S500). The defect characteristics may be different in the amount and energy of defects from each other according to positions. That is, the defect characteristics of each channel area CA may be changed due to a manufacturing process of the element TFT and process parameters. For example, the channel area CA adjacent to the source area SA may have a greater oxygen-related defect density $N_0$, and lager defect activation energy $E_a$ than the channel area CA in the center.

The defect analysis device DAE may extract values of the activation energy $E_a$ and the defect density $N_0$ through an advanced algorithm by measuring the current I, and a graph showing the defect density $N_0$ versus the activation energy $E_a$ may be obtained. Thereafter, the defect characteristics may be measured by analyzing the graph.

The analyzer AYP may perform Laplace transform on time-series current data generated by collecting current I, and thereby extract a decay constant ($\tau_t$). The analyzer AYP may calculate a defect density $N_0$ by using the extracted decay constant ($\tau_t$) and following Equation 1. Here, q may represent a basic charge amount, V may represent a voltage applied to a source, L may represent a width of a channel area, d* may represent a thickness of the channel area, l may represent a length of the channel area, μ may represent mobility of carriers (electrons), and τ may represent a recombination lifetime of carriers (electrons), $\tau_{tp}$ may represent a decay constant in a defect state, and $N_{0p}$ may represent a defect density in a defect state.

$$I(t) = qV\left(\frac{Ld^*}{l}\right)\sum_{p=1}\frac{\mu\tau N_{0p}}{\tau_{tp}}\exp\left(-\frac{t}{\tau_{tp}}\right) \quad \text{(Eq. 1)}$$

In addition, the analyzer AYP may calculate defect activation energy $E_a$ by using the extracted decay constant $\tau_t$ and following Equation 2. γ may represent a material proportional constant, $\sigma_t$ may represent a capture cross-section of a defect, $k_b$ may represent a Boltzmann constant, and T may represent a temperature of an analysis target layer.

$$\ln(\tau_t T^2) = \ln(\gamma\sigma_t) - E_a/k_b T \quad \text{(Eq. 2)}$$

In the graph showing defect states, the X axis may represent the activation energy $E_a$, and the Y-axis may represent the defect density $N_0$. The first area A1 may overlap a portion of the source area SA and a portion of the channel area CA, and the second area A2 may overlap the channel area CA in a central section. The defect density $N_0$ of the shallow level may be greater in the first area A1 than in the second area A2. Also, the activation energy $E_a$ of defects corresponding to the deep level may be greater in the first area A1 than in the second area A2.

Referring to the shallow level bar graphs of FIGS. 6A to 6C, the bar graphs show that the defect density $N_0$ near 0 eV in FIG. 6A corresponding to the first area A1 may be greater than the defect densities $N_0$ near 0 eV in FIGS. 6B and 6C respectively corresponding to the second area A2 and the third area A3. In addition, the deep level activation energy of FIG. 6A is larger than the deep level activation energy of FIG. 6B and the deep level activation energy of FIG. 6B is larger than the deep level activation energy of FIG. 6C. That is, the deep level activation energy corresponding to the first area A1 is closest to 2.0 eV.

FIGS. 6A to 6C exemplarily show a procedure of acquiring quantitative data QD-A1, QD-A2, and QD-A3 on the basis of the current I (see FIG. 5D). In actual defect analysis methods, the quantitative data QD-A1, QD-A2, and QD-A3 may be quantitatively analyzed within a short period of time through advanced algorithms by performing machine-learning on numerous experimental values.

Through the defect analysis method according to an embodiment of the inventive concept, the defect characteristics may be analyzed in detail by identifying defect state activation energy $E_a$ and a defect density $N_0$. In addition, since a physical force or chemical influence is not applied to a thin film during a defect analysis, the defect state activation energy $E_a$ and the defect density $N_0$ in the thin film may be extracted without damaging the thin film.

Referring back to FIG. 3, when the measurement for a position where defect measurement is required has been completed (S600), the defect analysis device DAE (see FIG. 1) may perform a subsequent process on the basis of the quantitative data QD-A1, QD-A2, and QD-A3 (FIGS. 6A to 6C) (S700). When the measurement for the position where defect measurement is required does not have been completed (S600), the defect analysis device DAE may adjust the position at which the analysis target layer ATL (see FIG. 1) is irradiated with the light LT (see FIG. 1), and then repeat the measurement and the analysis.

The analyzer AYP of the defect analysis device DAE (see FIG. 1) may store correlation between element characteristics and defect measurement results before performing the subsequent process on the basis of the quantitative data QD-A1, QD-A2, and QD-A3. The correlation data may be used later for determining a defect measurement position according to the element characteristics, and used for a subsequent defect measurement, thereby making it possible to rapidly and accurately acquire the data, for each position, required for analyzing the defect characteristics of the element. Therefore, the accuracy of the subsequent process of the defect analysis device DAE may be improved.

The performing of the subsequent process on the basis of the quantitative data QD-A1, QD-A2, and QD-A3 may include changing process parameters according to the defect characteristics and repairing defects in the analysis target layer.

The changing of the process parameters may correspond to adjusting, on the basis of data about defective elements, the process parameters in order to prevent defects in other elements. The process parameters may include at least one condition such as a composition of the element, oxygen partial pressure, plasma power, process pressure, atmosphere gas, and heat treatment temperature during the manufacturing process of the element.

The repairing of the defects in the analysis target layer ATL may correspond to irradiating the area in which a defect is present with laser LT (or light). At this time, the laser LT may be the same as or different from the light used for measuring the defect in the manufactured element. The laser LT may have a wavelength corresponding to the defect to be repaired. By using the defect activation energy $E_a$ and the equation of $$E = hf = \frac{hc}{\lambda},$$

the laser having energy in the wavelength band corresponding to the defect may be emitted. The laser LT may be emitted from the light source LSP, but is not limited thereto. For example, the defect analysis device DAE may further include another light source LSP which emits laser LT for repairs.

According to an embodiment of the inventive concept, real-time irradiation of a defective position with light LT removes a defect at a specific position of an element, and thus, a display device may have improved quality and may be manufactured at a high yield.

Figure 7A:
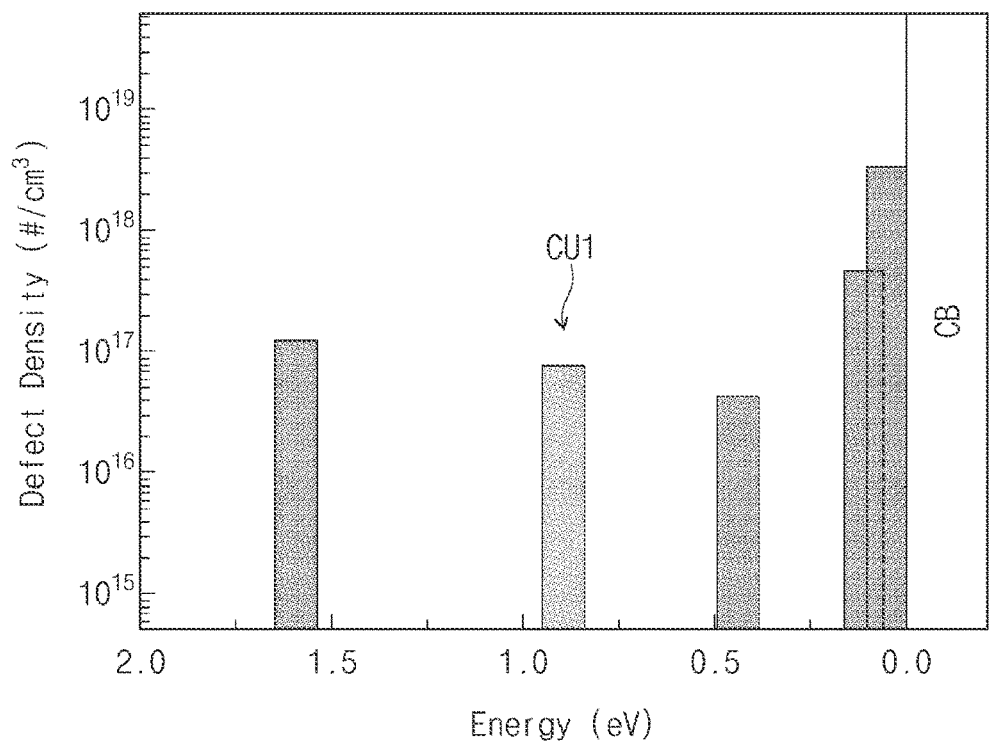
FIGS. 7A and 7B are graphs showing defect states according to a defect analysis method according to an embodiment of the inventive concept.
Figure 7B:
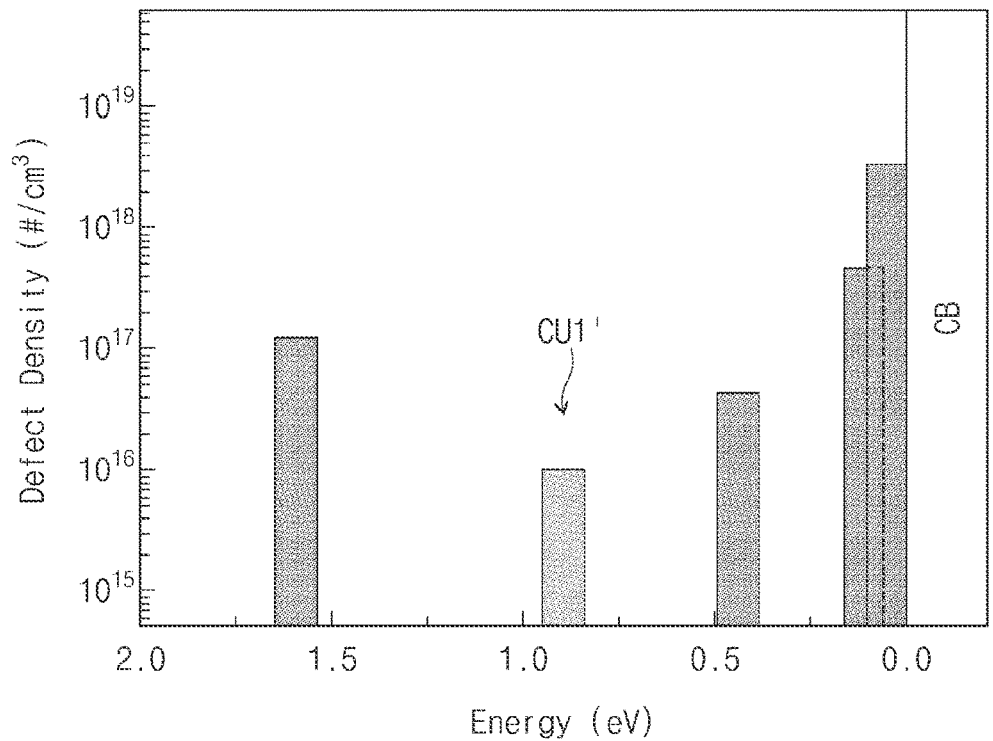

FIGS. 7A and 7B are graphs showing defect states according to a defect analysis method according to an embodiment of the inventive concept.

Referring to FIGS. 1, 7A, and 7B, in order to repair defects corresponding to various energies present in the channel area CA, the laser in a wavelength band corresponding to the energy of a defect to be repaired may be emitted to the channel area CA, thereby controlling a defect density. The laser having a wavelength of 1310 nm and 1 eV energy was emitted in order to repair the defect corresponding to a first repair graph CU1 of FIG. 7A, and as a result, it was confirmed that the defect density $N_0$ of a first repair graph CU1' of FIG. 7B was reduced. That is, when an element has an abnormal defect characteristic or a defect characteristic different from the reference element after a defect at each position of the element is measured, the element TFT may be repaired by irradiating the channel area CA with the laser in the wavelength band corresponding to the energy of the defect to be repaired.

Figure 8:
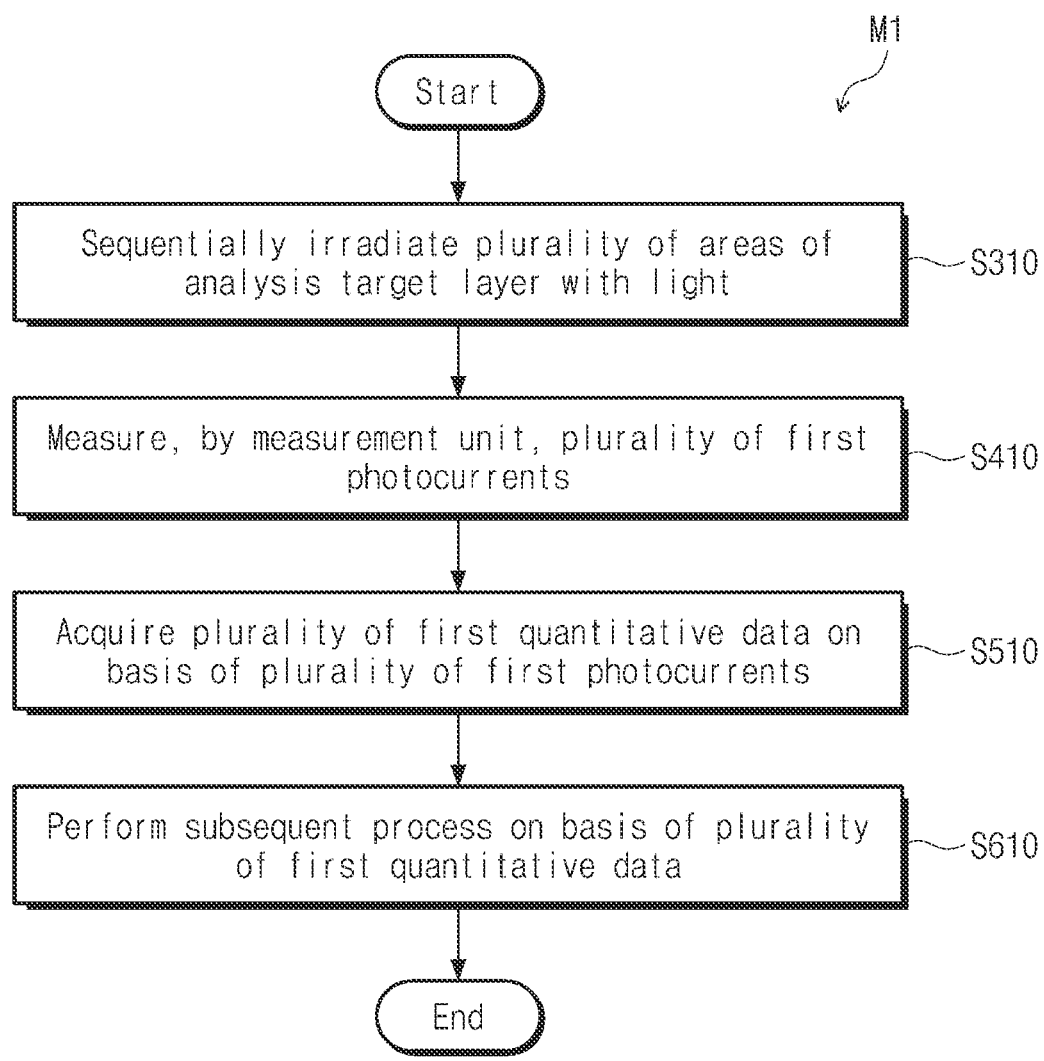
FIG. 8 is a flowchart of a defect analysis method according to an embodiment of the inventive concept.
Figure 9:
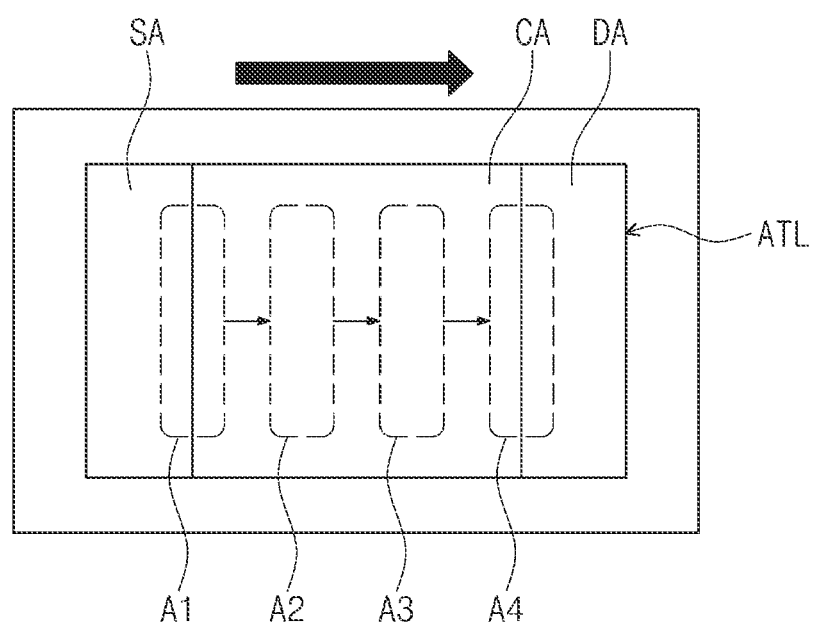
FIG. 9 is a plan view illustrating a part of a defect analysis method according to an embodiment of the inventive concept.
Figure 10A:
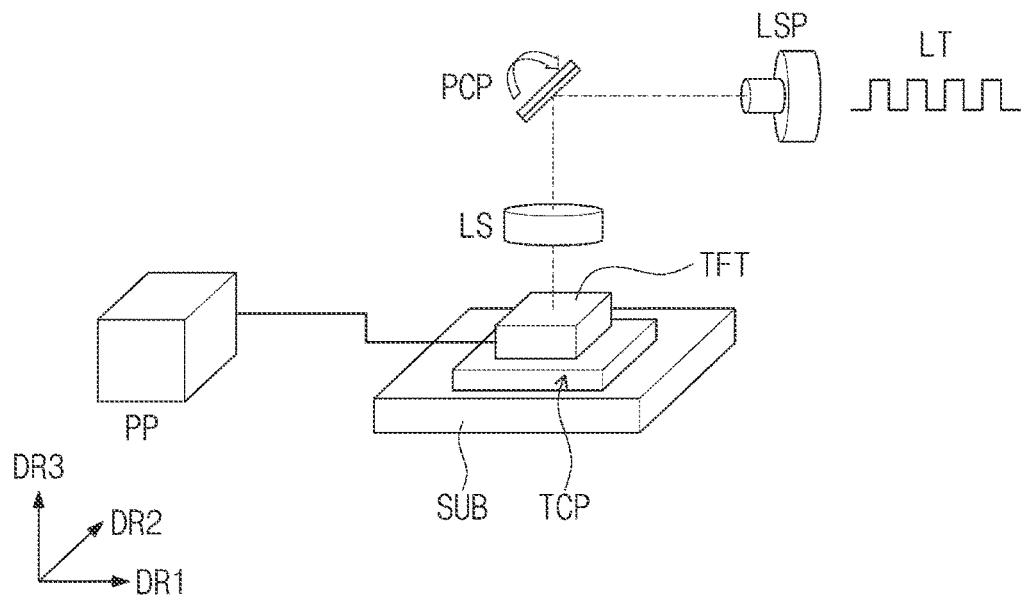
FIGS. 10A and 10B are perspective views illustrating a part of a defect analysis method according to an embodiment of the inventive concept.

FIG. 8 is a flowchart of a defect analysis method according to an embodiment of the inventive concept. FIG. 9 is a plan view illustrating a part of a defect analysis method according to an embodiment of the inventive concept. FIG. 10A is a perspective view illustrating a part of a defect analysis method according to an embodiment of the inventive concept.

Referring to FIGS. 1, 8, and 9, in the first mode M1, the defect analysis device DAE may sequentially irradiate a plurality of areas A1, A2, A3, and A4 of the analysis target layer ATL with light (S310). The plurality of areas A1, A2, A3, and A4 may include a first area A1, a second area A2, a third area A3, and a fourth area A4. The light source LSP may sequentially irradiate the first area A1, the second area A2, the third area A3, and the fourth area A4 with the light LT. The first area A1 may overlap the boundary between the source area SA and the channel area CA, the second area A2 and the third area A3 may overlap the channel area CA, and the fourth area A4 may overlap the boundary between the drain area DA and the channel area CA.

Referring to FIGS. 1 and 10A, the defect analysis device DAE may further include a lens LS and a position adjuster PCP which adjusts a position to be irradiated with the light LT. In the first mode M1 (see FIG. 8), the position adjuster PCP may adjust an irradiation position of the light LT emitted from the light source LSP.

The position adjuster PCP may be disposed between the light source LSP and the lens LS. The position adjuster PCP may adjust an angle to adjust the position at which the element TFT is irradiated with the light LT. When the irradiation position of the light LT is changed, the angle of the position adjuster PCP is adjusted while the light source LSP is fixed, thereby changing a position to be irradiated with the light LT. That is, a method of scanning the analysis target layer ATL (see FIG. 9) while changing the irradiation position of the light LT by the position adjuster PCP may be used. The light LT, of which a propagation direction is changed by the position adjuster PCP, may be concentrated through the lens LS. The position adjuster PCP may adjust not only the irradiation position of the light LT emitted for measuring defects but also the irradiation position of the light LT (or laser) emitted for repairing the defects.

Referring back to FIGS. 1 and 8, the detector MMP may measure a plurality of first photocurrent I (see FIG. 5D) generated by sequentially irradiating the plurality of areas A1, A2, A3, and A4, (see FIG. 9) with the light LT in the first mode M1 (S410). The method of measuring the current I may be substantially the same as the method of measuring the current I described above in FIGS. 5A to 5C.

The analyzer AYP of the defect analysis device DAE may acquire the plurality of first quantitative data QD-A1, QD-A2, and QD-A3 (see FIGS. 6A to 6C) about the plurality of first photocurrents I in the first mode M1 (S510). The plurality of first quantitative data QD-A1, QD-A2, and QD-A3 may be related to the defect state activation energy $E_a$ and the defect density $N_0$ of the analysis target layer ATL. The plurality of first quantitative data QD-A1, QD-A2, and QD-A3 respectively corresponding to the plurality of areas A1, A2, A3, and A4 may be mapped for each position and for each defect.

Thereafter, the subsequent process may be performed on the basis of the plurality of first quantitative data QD-A1, QD-A2, and QD-A3 (S610). For example, the defect analysis device DAE may perform mapping, for each position and for each area, on a defect occurring in the first area A1, a defect occurring in the second area A2, a defect occurring in the third area A3, and a defect occurring in the fourth area A4, and analyze what kind of defects occur more frequently in each area and then perform a subsequent process suitable therefor. The characteristics of the defects occurring in the channel area CA adjacent to the source area SA or the drain area DA may be different from the characteristic of the defect occurring in a central section of the channel area CA. Therefore, adjustment of process parameters and the wavelength and intensity of the laser to be used for repair may vary according to the characteristics of the defects.

Additionally, the defect analysis device DAE may perform mapping on the plurality of first quantitative data QD-A1, QD-A2, and QD-A3 for each defect and the mapping result may be used when the same subsequent process is performed on the same defect. For the same defect, the adjustment of process parameters, or the characteristics of the laser to be used for repair in the subsequent process may be same or similar. Therefore, the subsequent process may be performed for each defect by using the mapping result of the same defect.

Figure 10B:
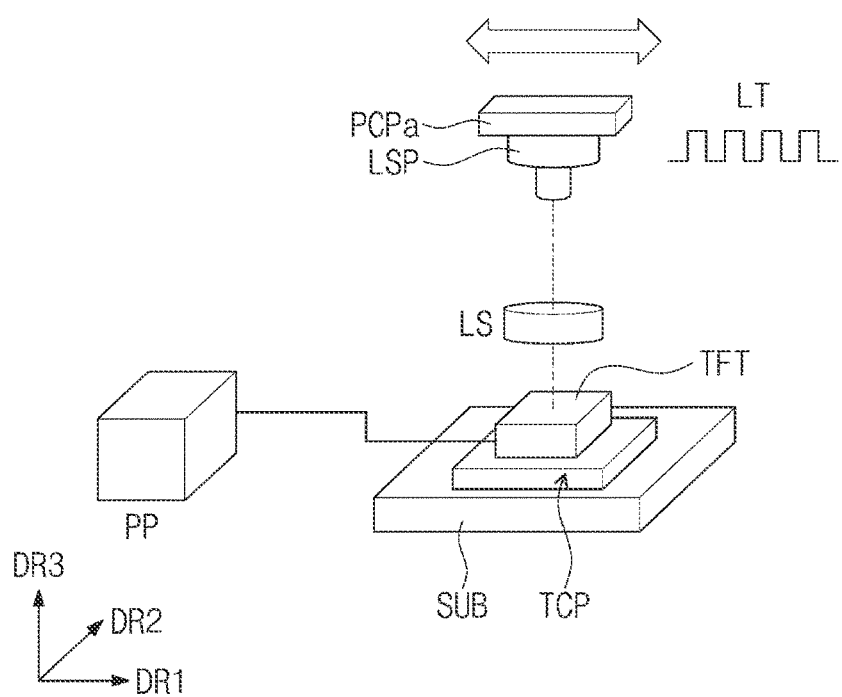

FIG. 10B is a perspective view illustrating a part of a defect analysis method according to an embodiment of the inventive concept. In the description of FIG. 10B, the description will be focused on the differences from FIG. 10A, the same reference numerals or symbols are used for the duplicated components and a description thereof will be omitted.

Referring to FIGS. 1 and 10B, the defect analysis device DAE may further include a position adjuster PCPa which adjusts a position to be irradiated with the light LT. In the first mode M1 (see FIG. 8), the position adjuster PCPa may adjust an irradiation position of the light LT emitted from the light source LSP. The position adjuster PCPa may be combined with the light source LSP to adjust the position of the light source LSP. The light LT emitted from the light source LSP may be incident on the lens LS. The position adjuster PCPa may adjust a position at which the element TFT is irradiated with the light LT by changing the position of the light source LSP. For example, when desiring to move the irradiation position of the light LT in the first direction DR1, the position adjuster PCP may shift the position of the light source LSP in the first direction DR1 to move the irradiation position of the light LT.

Figure 11:
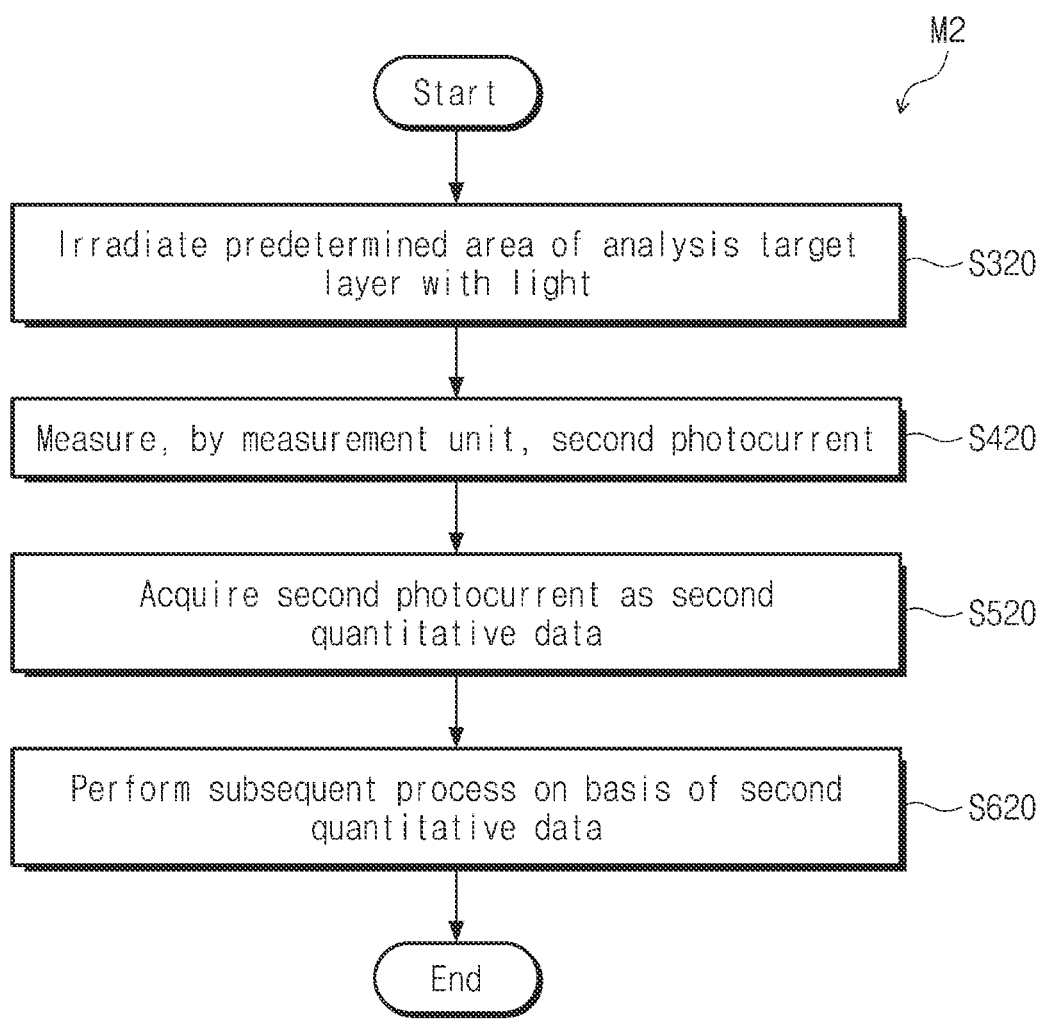
FIG. 11 is a flowchart of a defect analysis method according to an embodiment of the inventive concept.
Figure 12A:
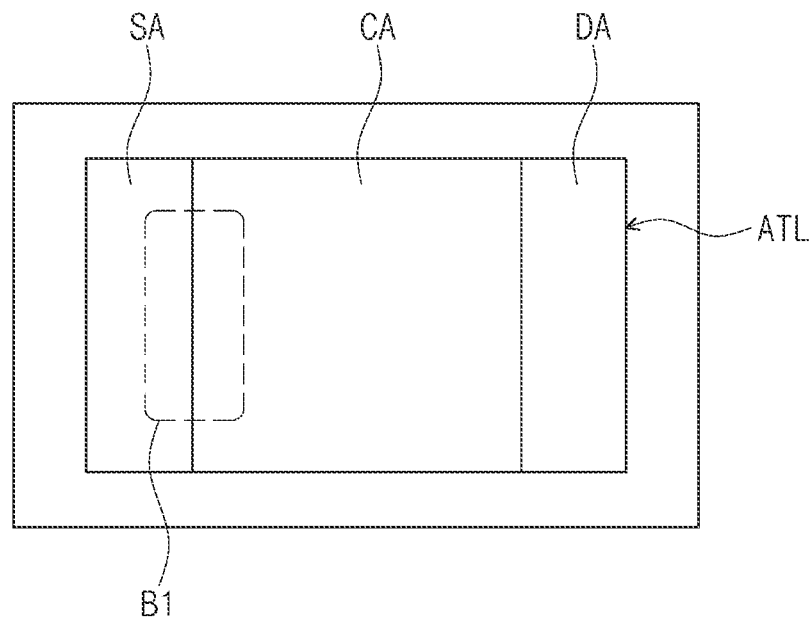
FIGS. 12A and 12B are plan views illustrating a part of a defect analysis method according to an embodiment of the inventive concept.

FIG. 11 is a flowchart of a defect analysis method according to an embodiment of the inventive concept. FIG. 12A is a plan view illustrating a part of a defect analysis method according to an embodiment of the inventive concept.

Referring to FIGS. 1, 11, and 12A, the analyzing of a defect may further include irradiating with light in a second mode M2 different from the first mode M1 (see FIG. 8). The light source LSP of the defect analysis device DAE may irradiate the light LT to a predetermined area B1 of the analysis target layer ATL in the second mode M2 (S320). The defect analysis device DAE may irradiate the light LT to the analysis target layer ATL for each position. For example, the predetermined area B1 may overlap the boundary between the source area SA and the channel area CA. Additionally, although not illustrated, the predetermined area B1 may overlap a portion of the channel area CA or the boundary between the drain area DA and the channel area CA. In this case, the defects in the specific area of the channel area CA may be analyzed.

The detector MMP may measure a second photocurrent I (see FIG. 5D) generated by irradiating the predetermined area B1 with the light LT in the second mode M2 (S420). The method of measuring the current I may be substantially the same as the method of measuring the current I as described above in FIG. 5A to 5C.

The analyzer AYP of the defect analysis device DAE may acquire second quantitative data QD-A1, QD-A2, and QD-A3 (see FIG. 6A to 6C) about the second photocurrent I in the second mode M2 (S520). The second quantitative data QD-A1, QD-A2, and QD-A3 may be related to the defect state activation energy $E_a$ and the defect density $N_0$ of the analysis target layer ATL.

Thereafter, the defect analysis device DAE may perform a subsequent process on the basis of the second quantitative data QD-A1, QD-A2, and QD-A3 (S620). The method of performing the subsequent process may be substantially the same as the method of performing the subsequent process as described above in FIGS. 3, 7A, and 7B.

Figure 12B:
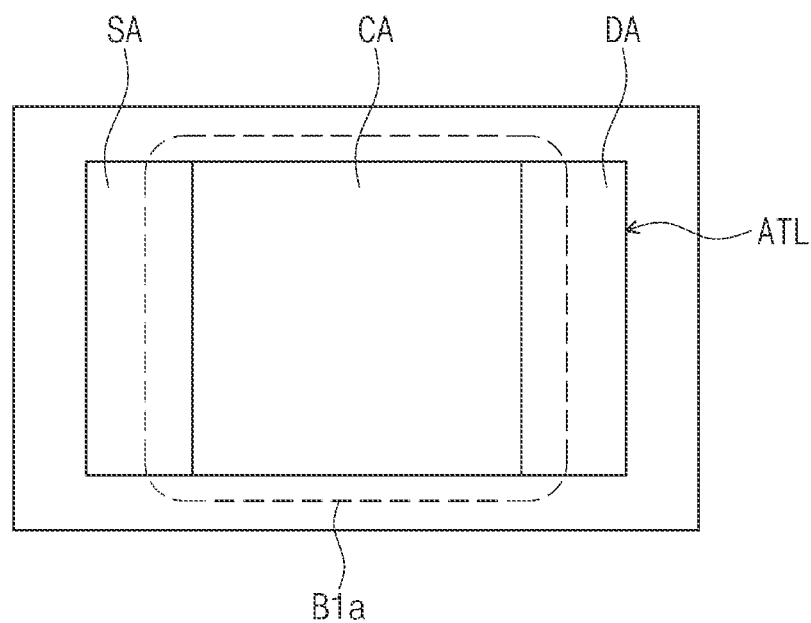

FIG. 12B is a plan view illustrating a part of a defect analysis method according to an embodiment of the inventive concept. In the description of FIG. 12B, the description will be focused on the differences from FIG. 12A, the same reference numerals or symbols are used for the duplicated components and a description thereof will be omitted.

Referring to FIGS. 1 and 12B, the light source LSP may irradiate a predetermined area B1a with light in the second mode M2 (see FIG. 11). The predetermined area B1a may overlap the entire channel area CA. The predetermined area B1a may include a portion of the source area SA, a portion of the drain area DA, and the entire channel area CA.

Figure 13A:
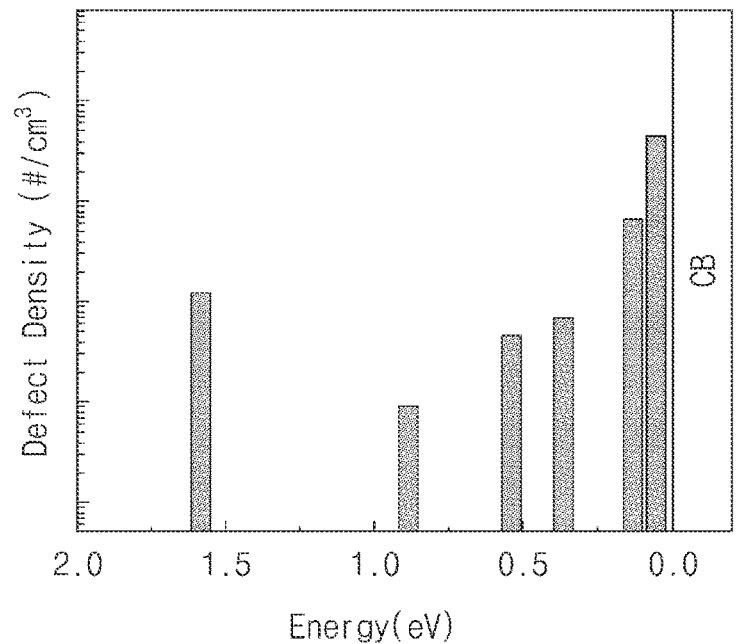
FIGS. 13A and 13B are graphs showing defect states according to a defect analysis method according to an embodiment of the inventive concept.
Figure 13B:
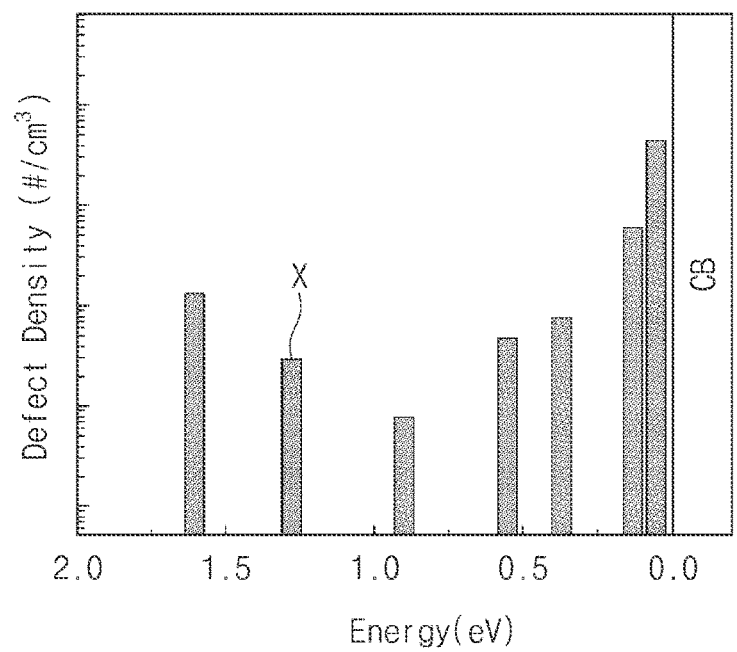

FIGS. 13A and 13B are graphs showing defect states according to a defect analysis method according to an embodiment of the inventive concept. FIG. 13A is the graph showing a defect state corresponding to a reference element 1 and FIG. 13B is the graph showing a defect state according to a reference element 2.

TABLE 1

| | Positive bias temperature stress (PBTS) $\Delta V_{th}$ |
| --- | --- |
| Reference element 1 | 0.34 V |
| Reference element 2 | 1.85 V |

Referring to Table 1, FIGS. 13A, and 13B, the positive bias temperature stress (PBTS) is one of reliability analysis methods to determine the reliability of an element by maintaining a device at high temperature and under a high voltage for a certain period of time and then re-inspecting the stress characteristics. The PBTS analysis results of the reference element 1 and the reference element 2 may demonstrate that the two elements have different operating characteristics, respectively. On the basis of the analysis results of the reference element 1 and the reference element 2 through the defect analysis method according to the inventive concept, the defect state of the reference element 2 in FIG. 13B further includes a bar graph X at energy of 1.27 eV compared to the defect state of the reference element 1 in FIG. 13A. As a result, referring to correlation between the existing element characteristics and defect characteristics, it may be understood that an oxygen-related defect occurs additionally in the reference element 2.

The defect analysis device or the defect analysis method according to an embodiment of the inventive concept may analyze quantitatively defects, thereby enhancing reliability of a defect analysis.

Figure 14:
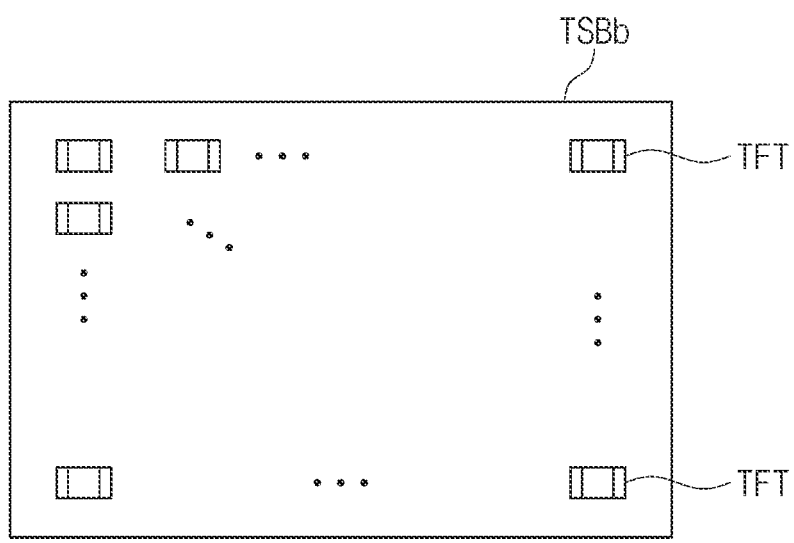
FIG. 14 illustrates an example of a test target substrate according to an embodiment of the inventive concept.

FIG. 14 illustrates an example of a test target substrate TSBb according to an embodiment of the inventive concept.

Referring to FIG. 1 and FIG. 14, the test target substrate TSBb may be a preliminary substrate which is not a final display panel but a display panel during a manufacturing process of a display panel. Therefore, the test target substrate TSBb may include a plurality of elements TFT. The defect analysis device DAE may analyze the defect characteristics of the plurality of elements TFT as quantitative data and perform mapping on the analyzed quantitative data for each position and for each area.

Thereafter, the defect analysis device DAE may perform a subsequent process on the basis of mapped data for each position or mapped data for each defect. Elements TFT required to be repaired among a plurality of elements TFT disposed on the test target substrate TSBb may be repaired and thus, defects may be removed immediately. The subsequent process for the plurality of element TFT may be substantially the same as the subsequent process for the single element TFT described above in FIG. 8.

As described above, a defect analysis device may quantitatively analyze defect characteristics by measuring current for each thin film or for each element TFT, and analyze correlation between an operating characteristic of the element TFT and a defect at each position of the element TFT, thereby providing information for a follow-up measure.

Additionally, the stored correlation data may be used later for determining a defect measurement position according to element characteristics and used as a reference element. Therefore, data required for a defect characteristic analysis may be acquired quickly and accurately, and the speed and accuracy of the subsequent process of the defect analysis device may be enhanced.

According to a defect analysis method described above, defect characteristics may be quantitatively analyzed by identifying defect state activation energy and a defect density. A physical force or chemical influence is not applied to a thin film during a defect analysis, so that the defect characteristics in the thin film may be identified without damaging the thin film.

An element having reduced defects or no defects may be manufactured by adjusting process parameters on the basis of the analysis result. In addition, a defect at the specific position of the element may be removed with light, thereby improving the quality and the manufacturing yield of a display device.

Although the embodiments of the inventive concept have been described, it is understood that the inventive concept should not be limited to these embodiments but various changes and modifications can be made by one ordinary skilled in the art within the spirit and scope of the inventive concept as hereinafter claimed. Therefore, the technical scope of the inventive concept is not limited to the contents described in the detailed description of the specification, but should be determined by the claims.

What is claimed is:

1. A defect analysis device comprising:
   a light source configured to irradiate an analysis target layer of an element with light;
   a position adjuster configured to adjust a position to be irradiated with the light;
   a detector configured to measure a current flowing between a source area of the element electrically connected to one end of the analysis target layer and a drain area of the element electrically connected to the other end of the analysis target layer in the element; and
   an analyzer configured to acquire quantitative data related to a defect in the analysis target layer on a basis of the current,
   wherein, in a first mode, a plurality of areas of the analysis target layer are sequentially irradiated with the light.

2. The defect analysis device of claim 1, wherein, in a second mode different from the first mode, a predetermined area of the analysis target layer is irradiated with the light.

3. The defect analysis device of claim 2, wherein the light supplied by the light source has a resolution of less than about 2 micrometers.

4. The defect analysis device of claim 2, wherein, in the first mode, the detector measures a plurality of first photocurrents generated by sequentially irradiating the plurality of areas with the light, and, in the second mode, the detector measures a second photocurrent generated by irradiating the predetermined area with the light.

5. The defect analysis device of claim 4, wherein, in the first mode, the analyzer acquires a plurality of first quantitative data about the plurality of first photocurrents and performs mapping on the plurality of first quantitative data corresponding to the plurality of areas, respectively, and, in the second mode, the analyzer acquires second quantitative data about the second photocurrent.

6. The defect analysis device of claim 1, wherein the defects comprise a physical defect caused by a foreign substance and a defect caused by a chemical bond of constituent atoms.

7. The defect analysis device of claim 1, wherein the quantitative data is related to defect state activation energy and a defect density of the analysis target layer.

8. The defect analysis device of claim 1, further comprising a temperature controller configured to control a temperature of the analysis target layer.

9. The defect analysis device of claim 1, further comprising a compensator configured to repair a defect in the analysis target layer on the basis of the quantitative data, wherein the compensator repairs a defect in the analysis target layer using heat energy by irradiating the analysis target layer with laser or changes a process parameter.

10. The defect analysis device of claim 1, wherein, in the first mode, the position adjuster adjusts an irradiation position of the light emitted from the light source.

11. The defect analysis device of claim 1, wherein the analysis target layer is a semiconductor layer comprising a channel area of the element.

12. A defect analysis method, the method comprising:
   adjusting a position at which an analysis target layer of an element disposed on a substrate is irradiated with light;
   irradiating the analysis target layer with the light;
   measuring a current flowing between a source area of the element electrically connected to one end of the analysis target layer and a drain area of the element electrically connected to the other end of the analysis target layer; and
   analyzing a defect characteristic of the analysis target layer as quantitative data on a basis of the current,
   wherein the irradiating of the analysis target layer with light includes irradiating the analysis target layer with light in a first mode in which a plurality of areas of the analysis target layer are sequentially irradiated with the light.

13. The method of claim 12, wherein the irradiating of the analysis target layer with the light further comprises irradiating the analysis target layer with light in a second mode different from the first mode,
   the second mode being a mode in which a predetermined area of the analysis target layer is irradiated with light.

14. The method of claim 12, wherein the light is supplied from a lower surface of the substrate toward the analysis target layer of the element disposed on an upper surface of the substrate.

15. The method of claim 12, wherein the light is supplied to the analysis target layer of the element disposed on an upper surface of the substrate, and a propagation direction of the light is directed from the upper surface to a lower surface of the substrate.

16. The method of claim 12, further comprising performing a subsequent process on the basis of the quantitative data.

17. The method of claim 16, wherein the performing of the subsequent process on the basis of the quantitative data comprises storing correlation between an element characteristic and the defect characteristic.

18. The method of claim 17, wherein the performing of the subsequent process on the basis of the quantitative data further comprises repairing a defect in the analysis target layer by irradiating laser in an area in which the defect is present.

19. The method of claim 18, wherein the laser has a wavelength corresponding to the defect to be repaired.

20. The method of claim 16, wherein the performing of the subsequent process on the basis of the quantitative data comprises changing a process parameter according to the defect characteristic,
   the process parameter including at least one condition such as a composition of the element, oxygen partial pressure, plasma power, process pressure, atmosphere gas, and heat treatment temperature during a manufacturing process of the element.

* * * * *